US006022164A

United States Patent [19]

Tsui et al.

[11] Patent Number: 6,022,164

[45] Date of Patent: Feb. 8, 2000

[54] CAPTIVE MULTI-POSITION FIXTURE

[75] Inventors: Gary Tsui, San Gabriel; Manfred Morghen, San Diego, both of Calif.

[73] Assignee: CBC Industries, Inc., City of Commerce, Calif.

[21] Appl. No.: 09/009,762

[22] Filed: Jan. 20, 1998

[51] Int. Cl.[7] ........ F16D 1/12

[52] U.S. Cl. ........ 403/78; 403/79; 411/400; 294/1.1

[58] Field of Search ........ 403/78, 79, 164, 403/165, 119; 411/400, 383; 410/101; 294/1.1, 82.1, 89

[56] References Cited

U.S. PATENT DOCUMENTS

| | | | |
|---|---|---|---|
| 2,519,460 | 8/1950 | Hansen | 403/78 X |
| 4,699,410 | 10/1987 | Seidel | 294/1.1 |
| 5,024,548 | 6/1991 | Timmington | 403/78 |
| 5,183,360 | 2/1993 | Freeman | 411/400 |
| 5,286,130 | 2/1994 | Mueller | 294/1.1 X |
| 5,823,588 | 10/1998 | Morghen | 294/1.1 |

*Primary Examiner*—Lynne H. Browne
*Assistant Examiner*—David E. Bochna
*Attorney, Agent, or Firm*—Bruce A. Jagger

[57] ABSTRACT

A multi-position fixture assembly comprising a captive body having a threaded end unitary with an enlarged end. The threaded end is adapted to threadably attach to an object to be lifted. The enlarged end of the captive body includes a swivel cavity and external hex head. The swivel cavity has a generally flat bottom and a generally cylindrical side wall. The hex head is easily engaged by a conventional wrench to torque the fixture to a workpiece. The cylindrical side wall of the swivel cavity includes an internally threaded portion which is opposed from the bottom. A hoist head with a flanged end and an opposed free end is assembled into the swivel cavity of the enlarged end of the captive body by means of an externally threaded retainer ring. The retainer does not bear on the flanged end so the flanged end is retained for free rotation inside the swivel cavity. Thusly retained, it is free to swivel through a 360 degree arc. A lifting loop is mounted to the free end of the hoist head. The enlarged end of the captive body generally includes a radially extending flange which bears against the surface of the workpiece to which the hoist ring is attached.

10 Claims, 2 Drawing Sheets

CAPTIVE MULTI-POSITION FIXTURE

BACKGROUND OF THE INVENTION

1. Field of the Invention

The invention relates in general to hoist ring assemblies and, in particular, to a compact, high strength, multi-position hoist ring assembly.

2. Description of the Prior Art

Hoist ring assemblies have been widely used throughout industry to provide, for example, a means for quickly attaching a lifting device such as a crane or jack to a heavy object which is to be lifted. Hoist ring assemblies are generally considered to be critical safety items because, if a failure occurs, a heavy object may be dropped resulting in damage to people, the object, and its surroundings.

A variety of hoist ring assemblies having different load and swivel capabilities had previously been proposed. One variety, for example, is capable of swiveling throughout a complete 360 degree arc, and at the same time capable of being swung throughout an arc of substantially 180 degrees in a direction perpendicular to the 360 degree swivel arc, irrespective of the manner in which the fixture is attached to the load. For purposes of ease of description, a hoist ring assembly having this swiveling capability is sometimes herein referred to as a "multi-position fixture".

Previous multi-position fixtures, such as, for example, those described in Tsui et al U.S. Pat. Nos. 4,705,422 and 4,641,986, utilize a through bolt or socket screw to mount the assembly to an object to be lifted. However, the load capacity of these multi-position fixtures are restricted by the ability of the through bolt or socket screw to resist applied loads.

The workers in this field have recognized that there was a need to provide a multi-position fixture having a greater load capacity than that of previous through bolt or socket screw designs without substantially increasing manufacturing costs.

These and other difficulties of the prior art have been overcome according to the present invention.

BRIEF SUMMARY OF THE INVENTION

An embodiment of the captive multi-position fixture according to the present invention comprises a captive body, a hoist head, and a retainer. The captive body includes an externally threaded end unitary with an enlarged end. The captive body is unitary in the sense that it is formed from a single piece of metal. The externally threaded end is adapted to be threadably received within a female threaded hole in a work piece to which the fixture is to be attached. The enlarged end includes a swivel cavity which is internally threaded for a portion of its axial length. The swivel cavity is formed in the end of the body which is opposed to the threaded stud. The swivel cavity generally comprises a generally cylindrical bore which is generally concentric with the longitudinal axis of the body. The cavity is open at one end, and closed with a generally flat circular wall at the other. The swivel cavity, when threadably engaged with an externally threaded retainer, is adapted to captively and swively retain the hoist head within the captive body adjacent to and mating with the generally flat circular wall. The enlarged end generally includes a radially extending flange of substantial width which is adapted to be drawn down firmly against the surface of the workpiece.

The hoist head includes a free end and a flanged end. The free end is adapted to attach to a lifting loop and the flanged end is captured inside the annular swivel cavity by the threaded retainer. The retainer threadably engages the internally threaded portion of the swivel cavity without bearing firmly against the flanged end of the hoist head. The flanged end is thus free to swivel or rotate through 360 degrees about its longitudinal axis within the swivel cavity.

Load capacity is increased, for example, by the reduction of cantilevered beam bending stresses due to the captive design. Load capacity is optimized by increasing the thickness of those elements that predominantly incur shear stresses. The enlarged end of the captive body generally transitions abruptly, by means of a radially outwardly projecting annular shoulder, from the diameter of the externally threaded end to that of the enlarged end. The diameter of the radially outwardly projecting annular shoulder should preferably be at least twice the diameter of the externally threaded end. Preferably, the surface of the annular shoulder is continuous so that the whole shoulder bears against the surface of the workpiece. This provides the best resistance to bending and shear forces. The captive body is generally torqued down so that this radially extending shoulder is drawn down very firmly against the surface of the workpiece which is to be lifted. Thus, in use, only the internally threaded enlarged end, with its outwardly opening annular swivel cavity, is visible.

The exterior of the enlarged end is preferably formed into a bolt head configuration. It is easy to apply large amounts of torque to this large bolt head with readily available conventional tools. The design which provides this ease of torque application tends to encourage the application of substantial torque in drawing the radial shoulder down against the workpiece. Safety is thus promoted. The number and expense of the parts used to assemble this device are minimized as compared to conventional hoist rings. It is desired to provide a multi-position fixture with the greatest load capacity possible at a given cost.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of hoist assemblies. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Figure 1:
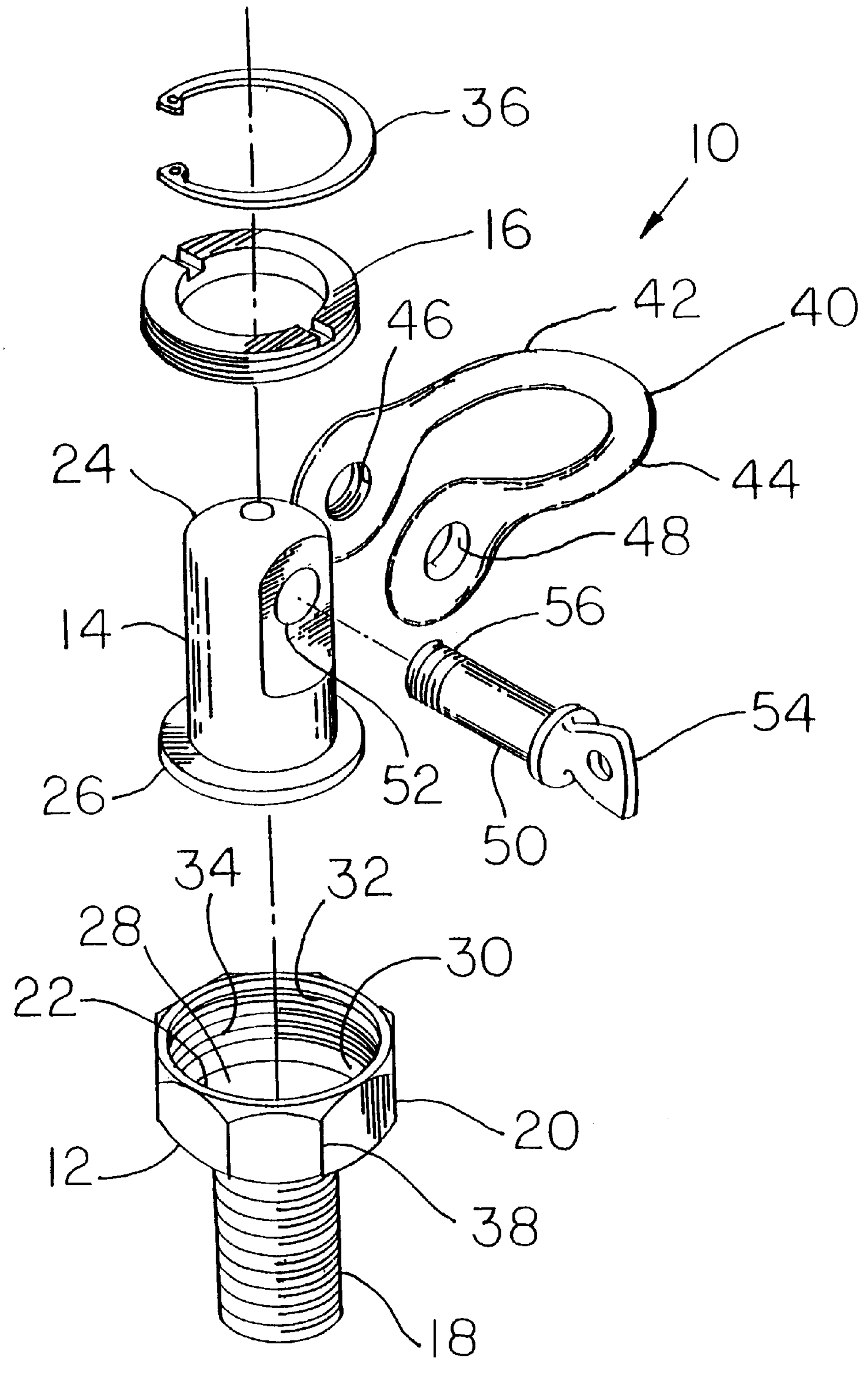
FIG. 1 is an exploded isometric view of a preferred embodiment of the invention.

Referring now to the drawings wherein like reference numerals designate identical or corresponding parts throughout the several views, there is illustrated generally at 10 a captive multi-position fixture assembly of the present invention. The fixture assembly 10 includes a captive body 12, a hoist head 14, and a retainer 16.

The captive body 12 includes a threaded end or stud 18 integral with an enlarged end 20. The enlarged end 20 has a swivel cavity 22 for captively and swively retaining the hoist head 14 together with the captive body 12.

The hoist head 14 includes a free end 24 integral with a flanged end 26. The free end 24 is adapted to attach to a lifting loop and the flanged end 26 is positioned inside the swivel cavity 22 of the captive body 12. Flanged end 26 defines a flange which projects generally radially outwardly from the generally cylindrical body of hoist head 14. The outer circumference of the flanged end preferably fits within the swivel cavity so that the flanged end is free to rotate about its longitudinal axis, but with very little radial movement or play. The retainer 16 is generally sized so that the generally cylindrical body of hoist head 14 is free to rotate about its longitudinal axis, but with very little radial movement or play. The retainer 16, when fully seated in the swivel cavity, does not bind flanged end 26 so as to prevent its rotation. It is, however, very closely spaced from the flanged end so as to prevent it from cocking out of alignment with the longitudinal of the captive body 12. In general, for hoist rings with flanged ends less than about three inches in diameter, the radial play of the flanged end should be less than about 0.005 inches, and the clearance between the flanged end and the retainer (the axial play) should be less than about 0.005 inches. Larger hoist rings are scaled appropriately so as to permit free rotation of the hoist head without significant radial or axial play. The flanged end 26 is generally in the form of a disk generally concentric with the generally cylindrical body of hoist head 14. The axial end of hoist head 14, which is defined by the outer side or face of this disk, is generally planar, and preferably mates with the corresponding surface in enlarged end 20.

The externally threaded retainer 16 engages the internal thread in swivel cavity 22, and captively and swively retains the flanged end 26 within the swivel cavity.

In a preferred embodiment referred to for purposes of illustration only and not limitation, in FIG. 1, the swivel cavity 22 includes a generally flat, circular, bottom surface 28 and a generally right cylindrical side wall 30. The cylindrical side wall includes a snap ring groove 32 and a threaded portion 34 which terminates at a location axially spaced from the bottom surface 28. With the flanged end 26 of the hoist head 14 placed inside the swivel cavity 22, retainer 16 threadably engages the threaded portion 34 of the cylindrical side wall 30, but does not bear against flanged end 26. When thus engaged, the hoist head 14 is captively and swively retained together with the captive body 12, thereby allowing hoist head 14 to rotate freely through a complete 360 degree arc with respect to the captive body. To prevent the retainer from backing out of the swivel cavity, a snap ring 36, for example, is mounted in snap ring groove 32 in the cylindrical side wall 30. Other methods of preventing the retainer from backing out of the swivel cavity are envisioned, for example, an interference pin could be driven between the threads of the retainer and the cylindrical side wall, and the like.

Preferably, enlarged end 20 is formed into a hex head 38. The hex head is provided so the threaded end 18 can be firmly torqued down to an object to be lifted with the use of a conventional readily available wrench. Also shown is a conventional clevis assembly including lifting loop 40 having two opposed legs 42 and 44, with each leg having a mount hole 46 and 48, respectively. A lift pin 50 is provided to pivotally secure the lifting loop 40 to the load bearing bore 52 within free end 24 of hoist head 14. This pivotal attachment permits the lifting loop to swing through an arc of 180 degrees or more in a direction perpendicular to the 360 degree arc through which the hoist head swivels.

In the embodiment shown in FIG. 1, lift pin 50 includes a tab 54 on one end and a threaded end 56 on the other end for threadably engaging with threads located in mount hole 46. Other methods of pivotally securing a lifting loop to the hoist head are envisioned, for example, in FIG. 2 the lift pin has a raised shoulder 58 on one end and a through hole 60 on the opposite end. Other like means can be employed if desired. The raised shoulder 58 prevents the lift pin from disengaging on one end. By installing a cotter pin, or the like, into the through hole 60, the lift pin is prevented from disengaging on the opposite end.

Figure 2:
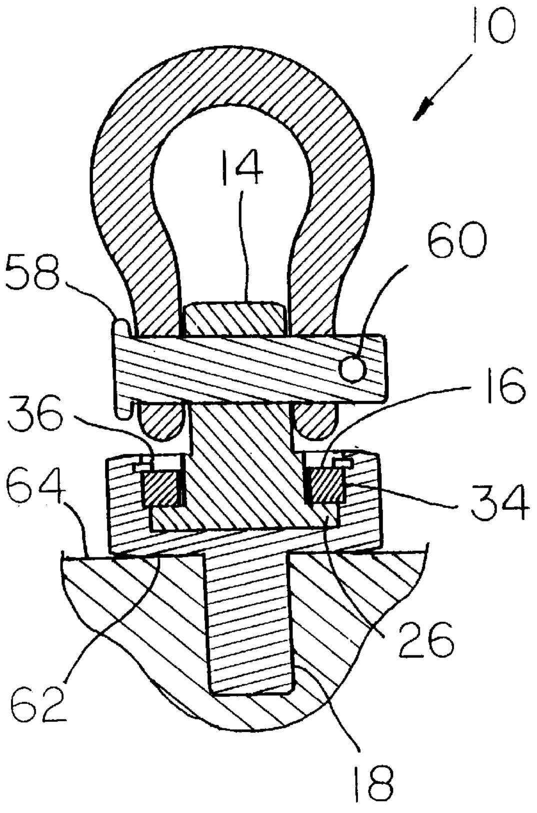
FIG. 2 PRIOR ART
FIG. 2 is cross-section view of a preferred embodiment of the invention.
Figure 3:
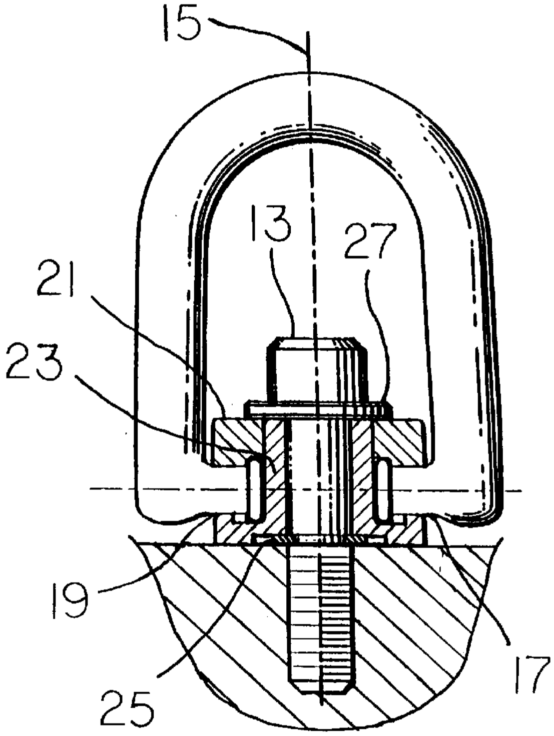
FIG. 3 is a partial cross-section view of a prior art hoist ring assembly.

The improved strength of the captive multi-position fixture of the present invention is apparent when discussed in conjunction with FIGS. 2 and 3. In FIG. 3 is shown a prior art hoist ring assembly which utilizes a socket screw or bolt 13 to attach the assembly to an object to be lifted. Arms 17 and 19 are pivotally socketed in a retainer ring 21. When the socket screw or bolt 13 is torqued down to an object to be lifted, the socket screw or bolt is pre-loaded in tension while retainer shim 23 and the central bushing are pre-loaded in compression. The length of the central bushing is such that retainer ring 21 is free to rotate about its longitudinal axis. In this embodiment, a shoulder on screw 13 engages the bearing washer 27. This bearing washer in turn engages the axial end of the central bushing. When the hoist ring assembly of FIG. 3 lifts an object in a direction not in line with the longitudinal axis 15 of the socket screw or bolt 13, significant bending stresses can be introduced in the socket screw or bolt near retainer clip 25 since the socket screw or bolt acts as a cantilevered beam. These bending stresses can occur particularly if the socket screw is not properly torqued down. The longer the length of a cantilevered beam between the shoulder on the head of screw 13 and the retainer clip 25, the greater the bending stress in the screw. This bending stress is accommodated in the construction of these prior devices, for example, by increasing the size of the parts for a particular rated load.

Referring particularly to FIGS. 1 and 2 of the present invention, any bending stresses which are incurred in the body 12 are not as significant in determining its load capacity compared to the prior art assemblies. Because the hoist head 14 is not integral with the threaded end 18, bending stresses are reduced. Bending stresses are also reduced because the effective length of the hoist head that acts as a cantilevered beam is less than the effective length of the prior art socket screw or bolt. In addition, the substantial flanged area 62 of the captive body 12 of the present invention engages the surface 64 of the object to be lifted over a relatively large area. This further reduces bending stresses. In the prior art assembly shown in FIG. 3, socket screw or bolt 13 requires a shoulder 27 to support lifting loads which have vectors that are in line with longitudinal axis 15. The shoulder 27 of the mounting socket screw or bolt must be sufficient to support shear stresses induced by the lifting load. The captive multi-position fixture of the present invention, does not require the presence of a retaining shoulder on the captive body 12 spaced from the face of the workpiece.

The load capacity of the present invention is predominantly determined by shear stresses instead of bending stresses. The critical shear stress areas are in the clevis assembly (lifting loop 40 and lift pin 50), and in the threaded stud 18 at the level of the surface 64 of the workpiece. In general, loads applied to failure axially of the assembly cause the clevis pin to shear, and loads applied to failure parallel to the surface 64 cause the body 12 to shear at the surface 64 of the workpiece. In general, the assembly is designed to the capacity of the clevis assembly. The other components are designed so as to slightly exceed the capacity of the clevis assembly.

Adjusting the capacity of the juncture between the body 12 and the head 14 requires only relatively small adjustments in the sizes of these parts. Slight increases in the thickness of the flanged end 26 and slight increases in the engagement area between the retainer 16 and the threaded portion 34 of the cylindrical side wall 30 provide substantial increases in the strength of these parts.

The diameter of the stud 18 is adjusted to provide the necessary shear strength for side loading. The diameter of the stud may be increased beyond that which is required by the rated capacity of the hoist ring, if desired. Since body 12 is generally formed from one integral piece of material, which is reduced in size to the desired diameter stud, no extra metal is required to form a larger diameter stud. In fact, less metal is removed in making a larger diameter stud, which saves time, energy and tooling wear. In order to be interchangeable with prior devices, such as that shown in FIG. 3, the diameter of the stud 18 is preferably the same as for a screw 13 in a prior safety hoist ring of the same load rating.

The costs of manufacturing the safety hoist ring of the present invention are substantially less than those incurred with prior safety hoist rings. The parts are simple to manufacture with conventional machine tools, and require few operations.

What has been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A multi-position fixture assembly adapted to swivel through a complete 360 degree arc, comprising:

a one piece captive body member including an extending threaded end and an opposed enlarged end, said threaded end adapted to attach said fixture assembly to an object, said enlarged end including a swivel cavity, said swivel cavity including an opening that opens opposedly to said threaded end;

a hoist head member including a flanged end and a free end, said flanged end being of a size to pass through said opening into said swivel cavity, said free end adapted to being attached to a lifting loop; and a retainer element cooperating with said enlarged end to block said opening and swively retain said flanged end in said swivel cavity.

2. A multi-position fixture as defined in claim 1 wherein said retainer element threadably engages said enlarged end.

3. A multi-position fixture as defined in claim 1 wherein said flanged end comprises a disk one piece with and projecting radially outwardly from said hoist head member.

4. A multi-position fixture as defined in claim 3 wherein said retainer element comprises a ring having an inside diameter which is less than the outside diameter of said disk.

5. A multi-position fixture as defined in claim 1 further comprising a lifting loop and a lift pin, said lift pin pivotally securing said lifting loop to said hoist head.

6. A multi-position fixture assembly adapted to swivel through a complete 360 degree arc, comprising:

a one piece captive body having a threaded end and an opposed enlarged end, said threaded end adapted to attach to an object to be lifted, said enlarged end including a swivel cavity and external hex head, said swivel cavity having a bottom, a generally axially extending opening opposed to said threaded end, and a generally cylindrical side wall, said hex head adapted to be engaged by a wrench to torque said fixture to an object to be lifted, said cylindrical side wall including a threaded portion;

a hoist head having a flanged end and a free end, said flanged end being received within said swivel cavity adjacent said bottom and said cylindrical side wall; said free end having a load bearing bore;

a retainer threadably engaging said threaded portion of said swivel cavity adjacent said flanged end and loosely retaining said flanged end within said swivel cavity;

a retainer locking member adapted to prevent said retainer from disengaging from said swivel cavity;

a lifting loop pivotally secured to said hoist head by a lift pin received in said load bearing bore.

7. A multi-position fixture assembly adapted to swivel through a complete 360 degree arc, comprising:

a one piece captive body having a threaded end integral with and opposed to an enlarged end, said threaded end adapted to attach said fixture assembly to an object to be lifted, said enlarged end having a swivel cavity, said swivel cavity opening generally axially opposed to said threaded end;

a hoist head having a flanged end and a free end, said free end having a load bearing bore, said flanged end positioned inside said swivel; and a retainer threadably engaging said swivel cavity and adjacent said flanged end, said retainer captively and swively retaining said flanged end within said swivel cavity.

8. A fixture as defined in claim 7 further comprising a snap ring, said snap ring engaging a groove in said swivel cavity and adapted to prevent said retainer from disengaging from said cavity.

9. A fixture as defined in claim 8 wherein said enlarged end includes a hex head adapted to permit said fixture to be torqued down to an object to be lifted.

10. A fixture as defined in claim 9 further comprising a lifting loop and a lift pin;

said lifting loop having two opposed legs, each said leg including a mount hole, said mount holes being generally in axial alignment with one another;

said lift pin pivotally securing said lifting loop to said hoist head by engaging said mount holes and a load bearing bore in said free end of said hoist head.

* * * * *